United States Patent [19]
Ryder et al.

[11] Patent Number: 5,186,532
[45] Date of Patent: Feb. 16, 1993

[54] HEADLAMP ADJUSTING MECHANISM AND HEADLAMP ADJUSTING ASSEMBLY

[75] Inventors: Francis E. Ryder, Arab; Rowland W. Kanner, Guntersville; Stephen P. Lisak, Arab, all of Ala.

[73] Assignee: Textron Inc., Providence, R.I.

[21] Appl. No.: 696,780

[22] Filed: May 7, 1991

[51] Int. Cl.$^5$ .............................................. F21M 3/18
[52] U.S. Cl. ..................................... 362/66; 362/69; 362/428
[58] Field of Search ....................... 362/66, 67, 69, 61, 362/271, 273, 287, 427, 428

[56] References Cited

U.S. PATENT DOCUMENTS

| | | | |
|---|---|---|---|
| 4,318,161 | 3/1982 | Shanks | 362/226 |
| 4,318,162 | 3/1982 | Sip | 362/226 |
| 4,674,018 | 6/1987 | Ryder et al. | |
| 4,689,725 | 8/1987 | Saijo et al. | 362/66 |
| 4,707,771 | 11/1987 | Van Duyn et al. | 362/66 |
| 4,713,739 | 12/1987 | Ryder et al. | |
| 4,722,029 | 1/1988 | Ahle et al. | 362/66 |
| 4,757,429 | 7/1988 | Ryder et al. | |
| 4,774,639 | 9/1988 | Baur et al. | 362/66 |
| 4,802,067 | 1/1989 | Ryder et al. | |
| 4,870,544 | 9/1989 | Iwamoto | 362/66 |
| 4,893,219 | 1/1990 | Lisak | |
| 4,894,754 | 1/1990 | Levilain | 362/66 |
| 4,939,945 | 7/1990 | Ryder et al. | |
| 4,974,123 | 11/1990 | Wallin et al. | 362/66 |
| 5,023,759 | 6/1991 | Eckenrode | 362/66 |
| 5,034,870 | 7/1991 | Weber | 362/66 |
| 5,070,433 | 12/1991 | Zillgitt et al. | 362/66 |

FOREIGN PATENT DOCUMENTS
157450 7/1986 Japan ...................................... 362/69

*Primary Examiner*—Richard R. Cole
*Attorney, Agent, or Firm*—Trexler, Bushnell, Giangiorgi & Blackstone, Ltd.

[57] ABSTRACT

There is disclosed an improved adjusting mechanism for an articulated headlamp construction or the like. The adjusting mechanism is comprised of a minimum number of parts, namely a housing, a scroll member and an adjusting rack member. The scroll member provides the input member for the mechanism and upon rotation thereof rotative movement thereof is transformed into transitory movement of the rack member pursuant to a spiral or scroll projection that is engaged with teeth on the adjusting rack member. The transitory movement of the adjusting rack member will correspondingly produce pivotal movement of the articulated headlamp component. If desired, the adjusting rack member may be curved so that the movement of the end thereof affixed to the headlamp will closely approximate the pivotal movement of the headlamp component. Further, there is disclosed a combination of an articulated headlamp component and an adjusting mechanism of the type having a rotatable input member and a output member operatively connected thereto for transitory movement upon rotation of the input member. In this regard, the output member is provided with a socket construction on the end thereof which is engaged with a ball component of a ball-headed screw affixed to an articulated headlamp thereby eliminating the need for brackets and individual socket components affixed to the headlamp as is the standard practice in the art.

44 Claims, 5 Drawing Sheets

HEADLAMP ADJUSTING MECHANISM AND HEADLAMP ADJUSTING ASSEMBLY

BACKGROUND OF THE INVENTION

The present invention relates to the automotive arts, and more particularly to a headlamp construction and the means for adjusting the position of an articulated headlamp assembly. More specifically, there is provided what is believed to be a novel overall combination of components for a headlamp assembly of the type including a pivotally mounted component, an adjusting mechanism and ball and socket connecting means for joining the adjusting mechanism to the pivotally mounted component, as well as a novel adjusting mechanism construction.

With modern day automobiles, most of the headlamps are what is termed in the art as a composite headlamp construction. The composite headlamps generally employ single housings which contain both the high and low beams, as opposed to the older seal beam arrangements wherein the high and low beam were separate components. In this regard, two general types or modes of composite construction are employed. The first is where a reflection mirror or component is moved with respect to a housing and a lamp unit, the other where the entire lamp unit is pivoted with respect to the autobody.

An automobile headlamp must be adjusted both at initial assembly and also during the service life of the vehicle so that the headlamp beam is properly aimed and also so it can be adjusted subsequent to accidents or after prolonged periods of use wherein vibration and other factors may tend to move the headlamp out of the desired position. There are numerous prior art adjusting mechanisms for headlamps, and in this regard specific attention is directed to the following United States Patents: U.S. Pat. No 4,674,018, Ryder et al., dated Jun. 16, 1987; U.S. Pat. No 4,757,429, Ryder et al., dated Jul. 12, 1988; U.S. Pat. No. 4,802,067, Ryder et al., dated Jan. 31, 1969; U.S. Pat. No. 4,893,219, Lisak, dated Jan. 9, 1990; U.S. Pat. No. 4,939,945, Ryder et al., dated Jul. 10, 1990 and U.S. Pat. No. 4,713,739, Ryder et al., dated Dec. 15, 1987, all of which are owned in part by the present Applicant. Attention is also invited to U.S. Pat. No. 4,689,725, Saijo et al., dated Aug. 25, 1987, which patents also disclose a prior art headlamp adjusting assembly.

The prior art arrangements and adjuster mechanisms are comprised of a substantial number of assembled components. More specifically, these prior art arrangements include a housing with at least a pair of gear members disposed therein, an adjusting screw or member, generally in the form of a screw threaded member extending from the housing and having its distal end operatively coupled with a pivotally mounted headlamp component, as well as an input or drive member also coupled to one of the gear members. In this regard, the input or drive member is rotated to operate the gears, with the gears and the other components of the adjusting mechanism utilized to transform the rotary motion of the drive member into a linear motion of the adjusting screw.

Further, with the prior art designs now in use, of the type as illustrated by U.S. Pat. Nos. 4,674,018 and 4,689,725 identified above, it will be noted that the adjusting screw or member which is engaged with the articulated headlamp component has a ball component of a ball-and-socket type connection on the end thereof. Correspondingly, the headlamp must be provided with some form of socket arrangement in which the ball is engaged in order to attain an articulated, movable connection between the respective components. As will be discussed more fully hereafter, this prior art design necessitated the employment of bracket members to mount the socket members to the headlamp housing. With the present invention, the aforesaid bracket members are no longer needed.

The geared headlamp adjusting mechanisms of the prior art design, while satisfactory in their function, are somewhat expensive due to the numerous components involved and the cost of assembly. Further, the method of interconnecting the adjusting member with the headlamp assembly has also proven troublesome in that assembly is time consuming and normally requires the employment of some form of metal bracket or housing on the headlamp to which the socket components are mounted. In this regard, reference is had to FIG. 8 of the drawings which illustrate the prior art construction in this regard, and which will be discussed in greater detail hereinafter. A comparison of the arrangement of FIG. 8 with the arrangement of the present invention in FIG. 9 dramatically illustrates the reduction in parts or components and, obviously, assembly time, achieved with the present invention. As such, it will be seen that the improved, simplified adjuster of the present invention and the novel arrangement of the overall assembly of components not only provides a simpler more economical arrangement, but also an arrangement which affords additional space within the area immediately behind the headlamp.

The present invention thus in effect provides multiple improvements over the prior art. Initially, with regard to the adjuster mechanism, per se, as will be discussed with respect to FIGS. 1-7 of the drawings, the adjuster mechanism includes a minimum number of components. Basically this adjuster mechanism includes only a housing, a scroll member and a transitory rack member. This should be compared to the multiple or numerous components of the prior art designs illustrated in the patents identified and discussed above. Correspondingly, the second aspect of the present invention, namely, the mounting of the socket construction to the end of the adjusting member, whether in the form of a transitory rack or a linearly movable adjusting screw, as employed in the prior art, affords an overall construction which results in a reduction of parts and ease of assembly, and thus lower overall cost. An additional feature of the adjusting mechanism of the present invention, is that the manner of engagement between the scroll member and the rack is such that the unit tends to be self-cleaning and upon operation will displace any dirt, debris or road grim which may accumulate between the teeth on the rack. Further, the components of the novel adjuster mechanism may all be fabricated from a thermoplastic resin material.

OBJECTS AND SUMMARY OF THE INVENTION

A general object of the present invention is to provide an improved adjusting mechanism which utilizes a minimum number of components.

Another object of the present invention is to provide an adjuster mechanism wherein the rack is of a curved configuration, such that the distal end of the rack which carries the means to which the headlamp assembly is interconnected, may move in an arc, thereby tending to mirror or correspond to the arcuate movement of the headlamp during adjustment and thereby reduce the stress on the various components.

A further object of the invention is to provide an adjusting mechanism that can be constructed entirely of components molded from a thermoplastic material.

A still further object of the invention is the provision of an adjusting mechanism wherein the adjusting member, be it in the form of an adjusting screw or an adjusting rack member, is provided with a socket component on the distal end thereof, and wherein the headlamp assembly is provided with bosses to which ball headed screws may be affixed with the ball portion of said screws disposed in said sockets to interconnect the adjusting members to the articulated headlamp construction.

Further objects and features of the invention will become apparent from the general description of the drawings to follow and the detailed description of the illustrated embodiments which also follows hereinafter.

BRIEF DESCRIPTION OF THE DRAWINGS

The features of the present invention which are believed to be novel are set forth with particularity in the claims appended hereto. The organization and manner of the invention, together with the further objects and advantages thereof are believed best understood by reference to the drawings of which the following is a brief description thereof. In the hereinafter identified drawings, like reference numerals identify similar or like elements and wherein:

DESCRIPTION OF THE ILLUSTRATED EMBODIMENTS

Figure 1:
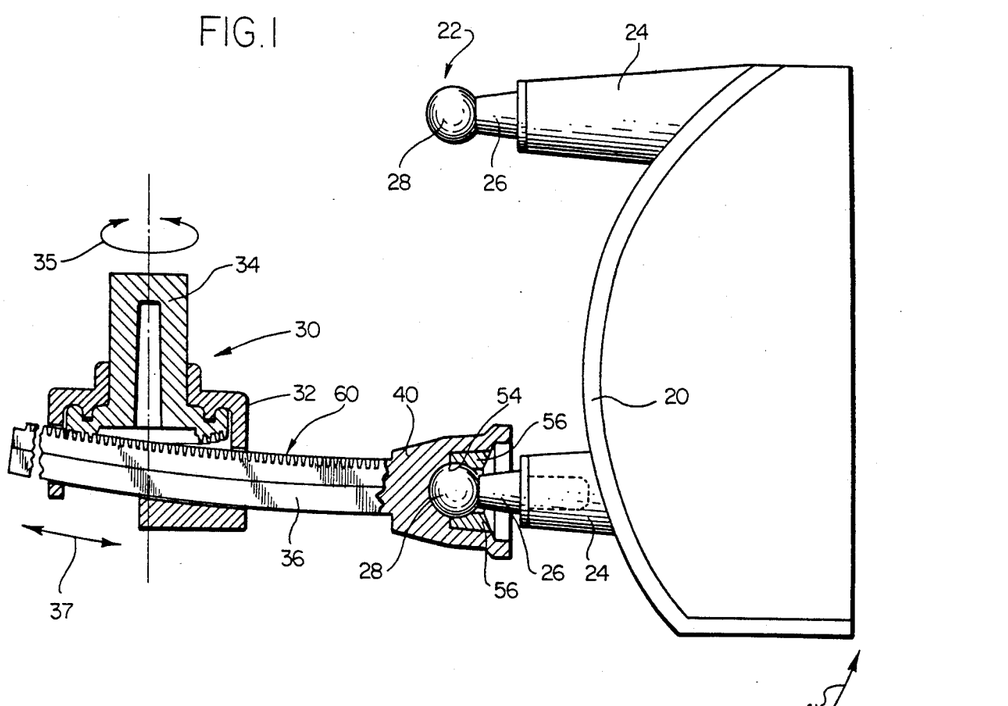
FIG. 1 is a partially schematic, elevational view of an adjusting mechanism in accordance with the present invention, mounted to an articulated headlamp component.

Referring now to the drawings and initially to FIG. 1, there is shown somewhat schematically and diagramatically, an articulated headlamp construction and adjusting mechanism in accordance with certain features of the present invention. More specifically, the headlamp construction (not shown in full detail) includes an articulated component in the form of housing 20 which is adapted or mounted for both vertical and horizontal movement about a fixed pivot point, designated generally 22. In this regard, it should be noted that the component 20 may be either a reflector component, or represent the entire headlamp housing. With the illustrated form of the invention, the housing 20 will be provided with a plurality of bosses 24 to which are affixed or attached ball-headed screws 26. The ball portion 28 of each screw 26 is disposed within a socket member, with only the socket member for the adjuster mechanism 30 being illustrated. It is to be understood, that the uppermost ball member 28 proximate location 22 will be engaged within a fixed socket (not shown in FIG. 1, but illustrated in FIG. 9) to define the fixed pivot point about which the headlamp component 20 rotates. Further, it should be noted that in FIG. 1 there is illustrated only the adjuster mechanism which will effect rotation of the headlamp in the vertical direction, as viewed. A similar adjusting mechanism 30 is employed to effect horizontal movement or adjustment, and if there are any questions as to the general configuration being discussed, reference should be had to FIG. 9 which illustrates not only the fixed pivot mounting point, but also both the horizontal and vertical adjuster mechanisms.

Thus, when it is desired to adjust the vertical position of the lamp, the adjuster mechanism 30 can be operated to produce pivotal movement of the headlamp housing 20. The construction of adjuster 30 and the manner in which this movement is attained will be discussed more fully hereinafter with regard to the adjuster mechanism 30, per se, and FIGS. 2–5.

The adjusting mechanism 30 is comprised of a minimum number of components, and is preferably constructed entirely of thermoplastic, resinous material. More specifically, the adjusting mechanism 30 includes a housing 32, an input or drive member 34 in the form of a rotatably mounted scroll component (to be discussed in greater detail hereinafter) and an adjusting rack or output member 36. Thus, the unit is comprised of but three major components and it is envisioned that the housing 32 may very well be incorporated in or provided directly by a mounting bracket assembly of the general type and kind shown at 100 in FIGS. 8 and 9.

The drive or scroll member 34 is directly interconnected to the adjusting rack member by a continuous spiral projection or tooth such that rotation of the drive or scroll member 34, as indicated by arrow 35, will produce transitory movement of the rack 36, as indicated by the arrow 37. In the preferred form of the adjuster mechanism 30, as shown in FIG. 1, the rack member 36 is provided with an integral socket component 40 in which the ball shaped head 28 of the screw 26 is engaged to effect an articulated interconnection between the transitory adjusting rack 36 and the pivotally mounted housing 20 of the headlamp construction. It can be appreciated that movement of the rack 36 in the directions as indicated by arrow 37 will produce pivotal movement of the headlamp housing about the fixed pivot 22, as indicated by arrow 41. A more detail discussion of the construction of the adjusting mechanism will be had with respect to FIGS. 2 and 3 which are presented on an enlarged scale. It should be noted, however, that the employment of an integral socket 40 with the rack 36, while being a preferred embodiment, is not essential to the overall construction of the adjusting mechanism 30. As such, it would be possible without departing from the aspect of the invention embodied in the mechanism 30 to employ the more conventional arrangement wherein a ball component is provided on the end of the adjusting rack member 36.

As a further matter, in the present discussion, the adjusting rack member 36 and the socket 40, or whatever means is employed on the end of the adjusting rack member 36 to effect interconnection with the headlamp assembly, may be referred to as "integral" in the sense that they are interconnected to provide a complete component. The term "integral" is not utilized in this specification, nor is it intended, to indicate only a one-piece construction, which of course is but one form or type of "integral" construction.

Figure 2:
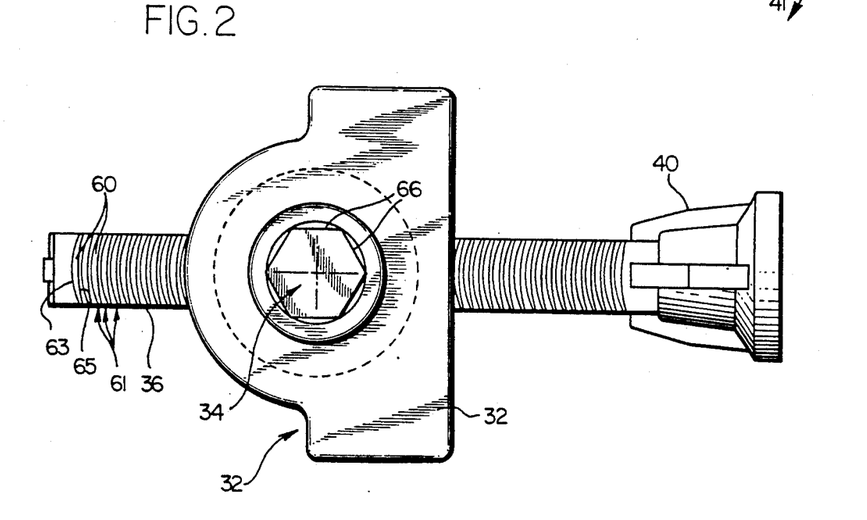
FIG. 2 is a top plan view of the adjuster mechanism of FIG. 1, on an enlarged scale and illustrating a preferred configuration for the teeth on the rack adjusting member.
Figure 3:
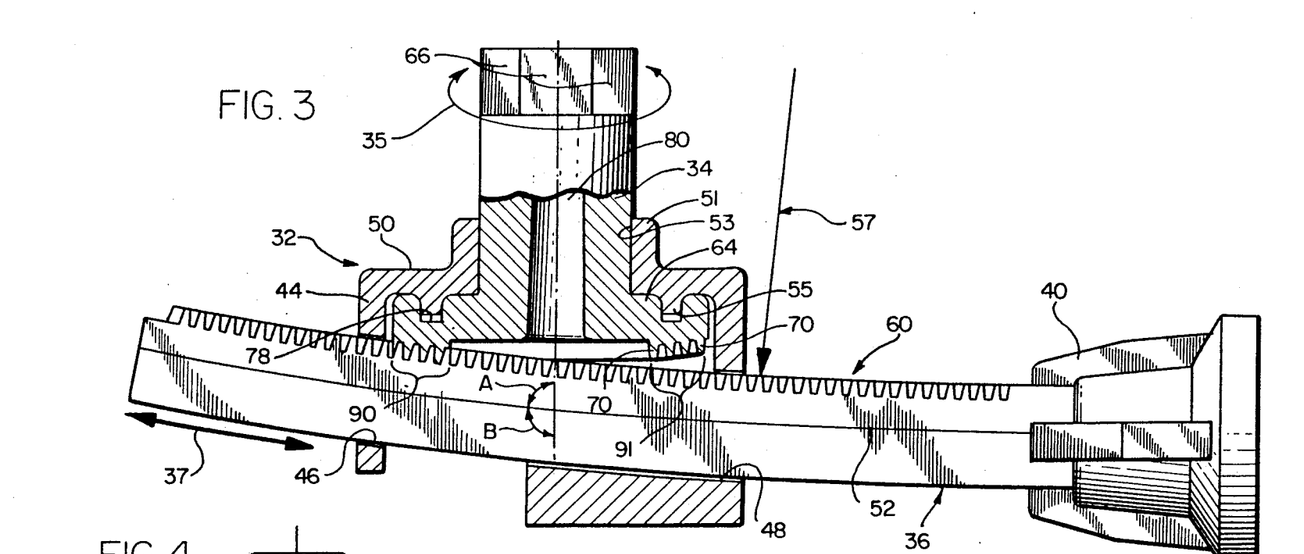
FIG. 3 is a partial sectional view also on an enlarged scale illustrating the construction of the adjuster mechanism of the present invention as shown in FIG. 1.

Attention is now directed to FIGS. 2 and 3, wherein the components of the adjuster mechanism 30 are illustrated in greater detail and on an enlarged scale. More specifically, the housing 32, FIG. 3, can be seen to be comprised of a main housing component 44 which is provided with spaced side walls having apertures 46 and 48 formed therein through which the adjusting rack member 36 extends. A cap or top portion 50 is provided which includes a boss 51 that provides an aperture 53 that receives the scroll member 34 and also serves to journal the scroll member 34 for rotation, as will be discussed in greater detail hereinafter.

The rack member 36 is relatively elongate and in the preferred, illustrated form, is of a rectangular cross-section and is curved as is illustrated by the axis 52 and radius 57. On the distal end of the rack member 36, that is the end projecting towards the headlamp assembly 20, there is provided the integral socket component 40. This socket component 40 includes an internal partially spherical socket 54 which is comprised of a plurality of segments 56 that can flex under load to permit the ball portion 28 of the screw 26 to be disposed therein with a snap-fit. These components are best viewed in FIG. 1.

The upper surface of the adjusting rack member 36 is provided with a plurality of teeth designated generally 60. In the illustrated embodiment of FIGS. 1-5, the teeth 60 extend along a substantial length of the rack member 36. The individual teeth 60 are of a arcuate, somewhat "D-shaped" configuration, FIG. 2, as said teeth 60 are defined by arcuate surfaces of different radii. In this regard, the curved or radiused surfaces which define teeth 60 are related to the configuration of the spiral or helix provided upon the scroll member 34 as discussed hereinafter.

Figure 4:
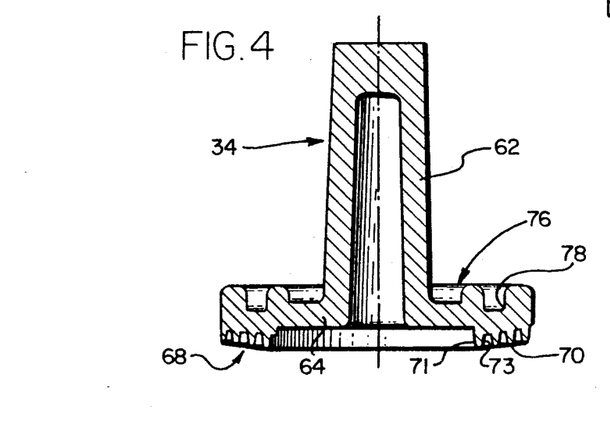
FIG. 4 is a sectional view of the scroll member which provides the drive or input component for the adjusting mechanism that drives the adjusting rack or output member of the adjusting mechanism.
Figure 5:
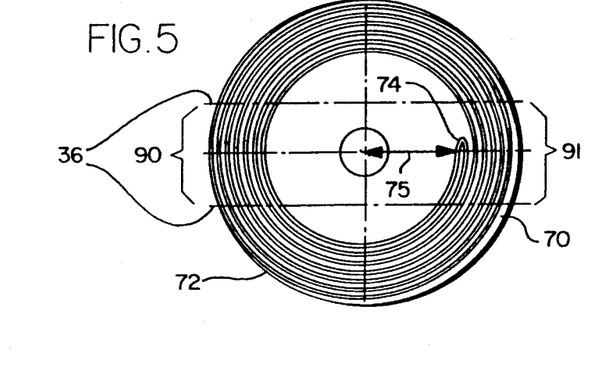
FIG. 5 is a bottom view of the scroll member of FIG. 4 illustrating the spiral or helical projection thereon.

The scroll member 34 which provides the input or drive component for mechanism 30 is illustrated in some detail in FIG. 3, but in greater detail in FIGS. 4 and 5. In this regard, the scroll member 34 is comprised of an elongate shank or projection 62 having an integral annular flange portion 64 on one end thereof. The opposite end of the shank portion 62 may be provided with tool engaging means 66 as best seen in FIGS. 2 and 3, or it may be knurled or otherwise adapted for manual rotation. The annular flange portion 64 has an axially outwardly facing surface designated generally 68, which is shown in full detail in FIG. 5. Formed in the surface 68 is a spiral projection 70. It should be noted that the spiral projection 70 is disposed generally upon a helix in the preferred embodiment but may be in a single plane, as shown in the alternate embodiment of FIG. 6.

The configuration of the spiral projection 70, which is referred to as a scroll, can best be appreciated from FIG. 5. In this regard, the spiral projection 70, starting at the radially outermost point thereof, includes a turn which starts at approximately the location 72, with the spiral projection 70 making approximately 4½ revolutions and terminating at the exit portion 74. The scroll-like spiral projection 70, in effect defines a continuous spiral tooth that extends about 4½ revolutions on the face of surface 68. The profile or cross-section of the spiral projection 70 corresponds to that of a conventional thread form in that there is employed tapered flanks 71 and 73 such that the continuous spiral tooth thus provided can be engaged in the space between the respective teeth 60 on rack 36, which space is designated 61 in FIG. 2. The degree of taper of flanks 71 and 72 is dictated by the angle A. In this regard, it can be appreciated that since the projection or tooth 70 is on a spiral, the radial dimension 75, FIG. 5, varies depending on the location of the spiral. Thus at point 74, the radial dimension 75 is a minimum, while a maximum at location 72. The arcuate surface which defines the teeth 60, FIG. 2, are defined by these radii, that is, the arcuate surface 63 corresponds to the minimum radius 75, while tooth surface 65 corresponds to the maximum radius 75 at location 72.

It is believed that a spiral projection 70 having a minimum of at least one complete revolution is required to attain the desired mode of operation. Also in the preferred form illustrated, the spiral projection 70 is continuous and uninterrupted. It would be possible, however, to provide interruptions or spaces in the spiral projection 70, if the spaces are not of excessive extent as to interfere with the desired mode of operation. Thus, while a continuous spiral projection which extends for at least one complete revolution is preferred, it is not intended to so limit the invention to this disclosed design, as effective operation may be possible with a scroll projection of less than one complete revolution, or with interruptions in the spiral.

The surface 76 of the annular flange portion 64 opposite surface 68 upon which the spiral projection 70 is formed, includes an annular recess 78. This recess is used to mount the scroll member 34 for rotative movement with respect to the housing 32 and to provide support for the scroll member at the location where the scroll member 34 engages the adjusting rack 36.

With regard to the mounting of the scroll member 34, the readers attention is directed back to FIG. 3 wherein it will be noted that the cap portion 50 includes an annular inwardly projecting flange 55 which is received within the annular groove 78 formed in the scroll member 34. The engagement of flange 55 in groove 78 of the scroll member 34, and the boss 51, serves to journal scroll member 34 for rotation about its axis 80 with respect to the housing 32. It also should be noted, as discussed previously, that the axis 52 of the rack member 36 is curved slightly as indicated by the radius 57 and that the openings 46 and 48 which accommodate this curved configuration of rack 36 are not disposed equi-distant from the scroll member 34. Thus, looking to FIG. 3, it can be seen that the spiral projection 70 of scroll member 34 will only engage the rack 36 at one location 90, to the left of the scroll center line 80, as the degree of curvature 57 is such to preclude such engagement at location 91 to the right of said center line 80, as viewed. Thus, the respective center lines 80 and 52 do not intersect to form right angles, but rather form acute and obtuse angles A and B.

Further, the continuous tooth provided by the spiral projection 70 on the scroll member 34 is configured to be received within or between the teeth 60 of the adjusting rack member. This engagement, however, takes place only at the left hand portion of FIG. 3, as viewed and then over only a limited area. This limited engagement is essential to the overall operation of the scroll member 34 and rack 36 in combination. In this regard, reference is had to FIG. 5, wherein the general disposition of the adjusting rack 36 with respect to the scroll member 34 and spiral projection 70 is illustrated in dotted outline, identified by reference characters 36. In this regard, the spiral projection 70 on the scroll member will engage the arcuate teeth 60 of the rack only across the cordal segment or area which is indicated by reference 90. At the diametrically opposed cordal segment 91 no engagement takes place due to the curve of the rack 36, and this can be seen in FIG. 3. At this location, due to the plurality of turns in the spiral projection 70, engagement will take place with a series of adjacent teeth 60. Thus, it can be appreciated that as the scroll member 34 is rotated as indicated by the arrow 35, FIG. 3, the spiral projection 70 with its plurality of turns will serve to drive the adjusting rack member 36 in the direction indicated by the arrow 37 and further that the path of movement of the socketed end 40 will be slightly arcuate due to the curved configuration 57 of the adjusting rack 36. The rack 36 is supported in this arcute movement by the curved configuration of opening 48 in the housing.

The arcuate movement of the adjusting rack member 36 is beneficial, in that it serves to reduce the stress on the joint components interconnecting the adjusting rack member 36 to the headlamp assembly 20. That is to say, the socket 40 will move in an arc, rather than in a straight line and thus will somewhat approximate or mirror the arc through which the headlamp housing and the ball 28 moves during adjustment. It can be appreciated that if the movement is strictly linear on the part of the socket 40, stresses would be created at the point of interconnection with the lamp component as the movement of the component housing 20 is arcuate rather than linear.

Figure 6:
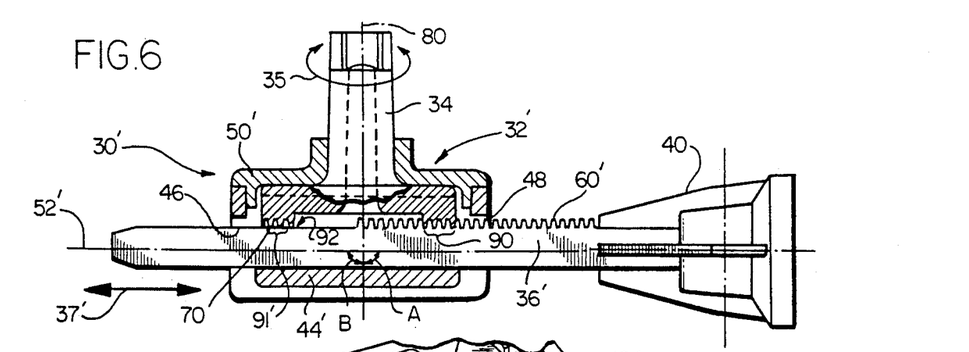
FIG. 6 is a sectional view of a first modified form of the adjuster mechanism of FIG. 1.
Figures 7, 8:
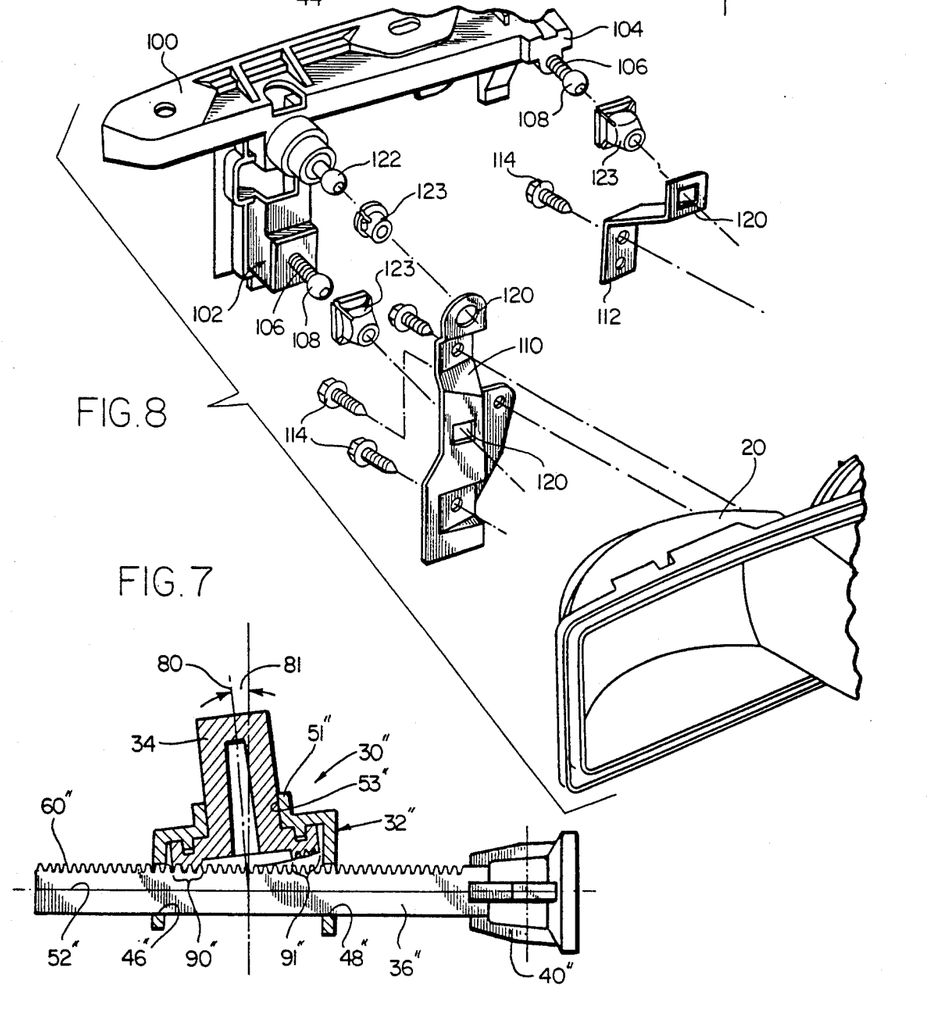
FIG. 7 is a sectional view of a second modified form of the adjuster mechanism, similar to FIG. 3.
FIG. 8 is a perspective view of a prior art form of mounting assembly for a headlamp.

While the embodiment of the adjuster mechanism 30 discussed above with regard to FIGS. 1–5 is a preferred form of the invention, several modified forms are shown in FIGS. 6 and 7. More specifically, the mechanism 30 relies upon the curvature of the rack 36 to attain the necessary clearance between the spiral projection 70 and teeth 60 at location 91. This clearance can be attained in alternate manners, two of which are shown in FIGS. 6 and 7. In this regard, the embodiments of FIGS. 6 and 7 have rack member 36' and 36" the axes of which are generally perpendicular to the axis 80 of the associated scroll member 34. A more detailed discussion of these embodiments follows.

A first modified form of the adjuster mechanism of the present invention is shown in FIG. 6. In FIGS. 6 and 7, components similar to those previously discussed are identified with like reference characters primed (') or double primed ("), and identical components are identified by the same reference numbers. More specifically, the adjuster mechanism 30' of FIG. 6 includes a housing 32' comprised of a separate boss component 44' and a cap 50'. Journalled within the housing 32' for rotative movement is a scroll member 34 similar in all general respects to that as discussed with regard to FIGS. 4 and 5 in that it includes a spiral projection 70. Also carried within housing 32' is a rack adjuster member 36' having a socket 40 on the distal end thereof. The housing 32' includes aligned apertures 46 and 48 through which the rack member 36' extends. Most importantly it should be noted that the rack member 36' is not curved and that the upper surface of rack 36, viz., that facing the scroll member 34, has teeth 60' only along a portion thereof, as shown. The remainder or adjacent portion of said upper surface of said rack 36' is relieved as indicated at 92, such that the surface at location 92 is disposed below and will not engage the spiral projection 70 at the location 91. Also with these embodiments of FIG. 6 and a straight rack 36', the axis 52' of the rack and the axis 80 of scroll member 34 are disposed substantially at right angles, thus both angles A and B are approximately 90°.

Thus, with the embodiment of FIG. 6, the spiral projection 70 will engage rack teeth 60' only at the location 90', wherein spiral projection 70 will engage with a series or number of teeth 60. It must be stressed that no engagement of the turns of the spiral projection 70 take place proximate the relieved area 92, location 91' for the spiral projection 70. Accordingly, as the scroll member 34 is rotated, arrow 35, the rack member 36' will move back and Due to overall configuration of adjusting mechanism 30', the degree of linear movement 37' will be limited. That is looking to FIG. 6, the rack member 36' can move to the left only until the inner end of teeth 60' engage the spiral projection to the left of the scroll member center line 80. Correspondingly, the rack 36' can be moved to the right only as long as the spiral projection 70 and teeth 60' are engaged. In practice, sufficient movement will be built into the mechanism 30' to handle that as required during in-service headlamp adjustment.

The mechanism 30', as illustrated and described has the respective scroll member axis 80 and rack axis 52' disposed gently at right angles, the axis 52' of rack 36' being approximately linear. As such, the movement of the socket 40 will also trace a linear path.

With regard to the embodiment of FIG. 7, the adjusting mechanism is designated generally 30". The housing 32" is similar to that of FIG. 3 except as noted hereinafter. Most importantly, the rack 36" is relatively straight, with the scroll member 34 having its axis 80 tipped or canted to the left as viewed several degrees from the vertical, as indicated at 81. To accommodate these variations, the boss 51" and associated aperture 53" have been modified, i.e. disposed at an angle to the perpendicular or vertical and the position of openings 46" and 48" have been relocated to accommodate the relatively straight rack member 36".

The degree to which the axis 80 of the scroll gear member 34 is tipped is sufficient to dispose the spiral projection 70 above the teeth 60" on rack 36" at the location 91". Thus, engagement of the teeth 60" with the scroll gear spiral projection 70 takes place only proximate the cordal segment 90". Further, the axis 80 is disposed relative to the axis 52" of the rack 36", such that the intersection thereof will define acute/obtuse angles.

Thus, with the embodiment of FIG. 7 it is possible to employ a straight adjusting rack member 36" without limitation on the extent of the rack teeth 60", as is the case with the adjusting mechanism 30' of FIG. 6. Also, it is envisioned that other modifications may be employed which would permit use of a straight adjusting rack member with continuous teeth. For example, the scroll member could be comprised of two components, connected by a universal type joint, with the first having an elongate shank extending from the housing and disposed perpendicular to the rack member, with a second portion disposed at an acute angle to the rack and having the spiral projection or gear tooth thereon.

Figure 9:
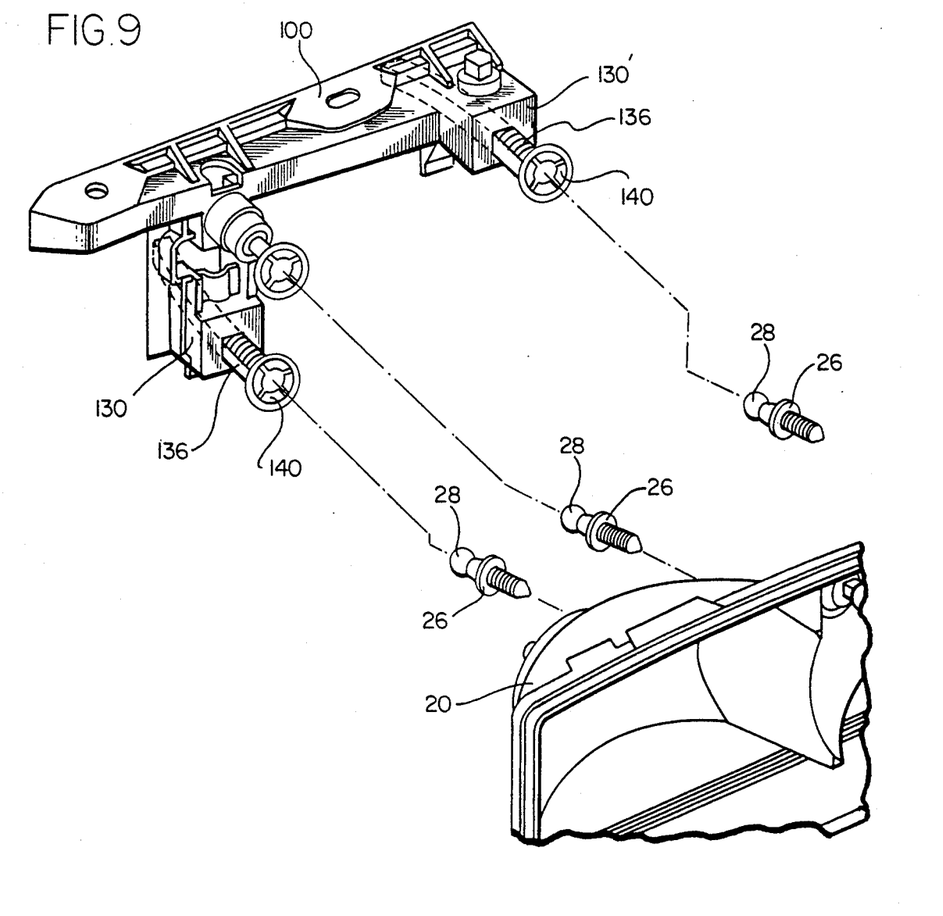
FIG. 9 is a perspective view similar to FIG. 8 but illustrating the arrangement of the present invention and also demonstrating the substantial reduction in parts and components achieved with one aspect of the present invention.

Attention is now directed to FIGS. 8 and 9 where an additional aspect of the present invention is illustrated. As mentioned previously, FIG. 8 is an illustration of a prior art configuration of headlamp mounting and adjustment assembly. In this regard, a bracket or assembly 100 is affixed to the frame or body of the auto. The assembly 100 includes one or more adjuster mechanisms, as well as a stationary pivot, all of which are adapted to be connected to the headlamp housing 20. In this regard, the assembly 100 will have a stationary pivot point 122, a vertical adjusting mechanism designated generally 102, and a horizontal adjusting mechanism designated generally 104. The adjusting mechanisms are similar to those illustrated in one or more of the prior art patents identified above, and each adjusting mechanism 102 and 104 includes a linearly movable adjusting screw 106 having a ball portion 108 on the end thereof. Similarly, the stationary pivot 122 is in the form of a ball configuration.

As such, each of the ball configurations 122 and 108 must be interconnected to the housing 20 of the headlamp construction. To effect this interconnection with the illustrated prior art design, it is necessary to employ a plurality of brackets 110 and 112 and socket elements 123. Further, some means must be provided for attaching the brackets 110 and 112 and sockets 123 to the headlamp housing 20. As such, brackets 110 and 112 are affixed directly to the housing 20 by the use of screws 114. Each bracket being provided with an opening 120 into which a socket component 123 is inserted. The respective socket components 123 define internal partially spherical sockets into which the balls 108 and 122 are snap-fitted. The socket components 123 are initially assembled over the balls 108 and 122 and the respective socket components are then disposed within the apertures 120 in brackets 110 and 112 with a snap-fit so that the periphery of the apertures 120 serve to maintain the socket assembly 123 in engagement about the ball segment 108 or 122 and prevent inadvertent disengagement.

By comparison, an assembly in accordance with one concept of the present invention is shown in FIG. 9. In this regard, the bracket or assembly 100 provides housings 32 for adjuster assemblies 130 and 130', of the general type as discussed with regard to FIGS. 1-7, each with adjusting rack member 136 movable relative thereto. However, in place of the ball segments 108 and 122 of the prior art as discussed with regard to FIG. 8, the ends of rack member 136 and the stationary pivot 122 are defined by integral socket components designated 140. The headlamp housing 20 merely has a plurality (three) of ball-headed screws 26 affixed to bosses (not shown) formed thereon at appropriate locations. The ball portions 28 of the ball-headed screws 26 are snap-fitted into the sockets 140 to effect the desired articulated interconnection.

Thus, by comparing the prior art assembly of FIG. 8 with the assembly of the present invention as shown in FIG. 9, it can be seen that the brackets 110 and 112 have been eliminated, as have a number of the mounting screws. Further, separate or individual socket components 123 are no longer need as they are formed integral with the ends of the adjusting members 136 and the stationary pivot 122. Thus, it can be appreciated that not only are the number of overall parts reduced with the present invention but the amount of labor and effort necessary to attain assembly has also been significantly reduced. In addition, the space behind a headlamp housing 20 has in effect been enlarged or cleaned up with the elimination of the brackets 110 and 112.

Attention is now directed to FIGS. 10-14 of the drawings, wherein modified forms of the socket construction 40 have been illustrated. In this regard, the embodiments shown may be employed as an alternative to the socket construction 40 illustrated in the drawings discussed above, and in this regard, like components in these drawings will be identified by similar reference character. With the above in mind, discussion will now be had initially with regard to the embodiment of FIG. 10.

Figure 10:
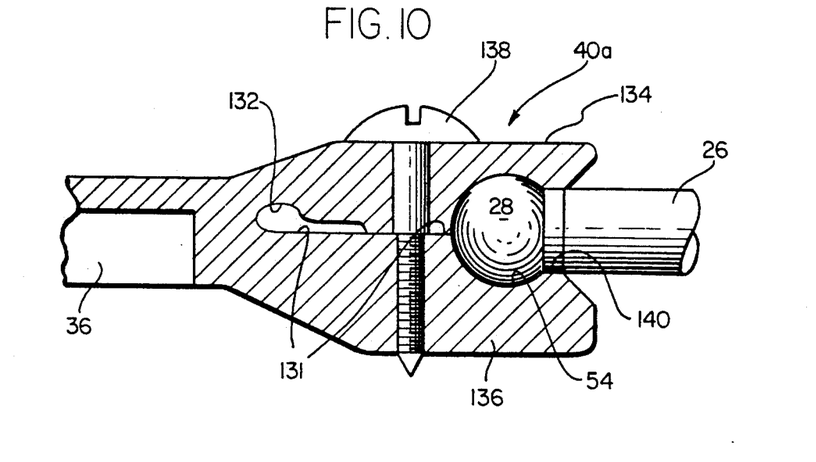
FIG. 10 is a sectional view of one form of socket construction that can be used with either aspect of the present invention.

In FIG. 10, the socket is designated 40a and is shown engaged about the ball portion 28 of a ball screw member 26, the screw portion of the member 26 has not been illustrated. In this regard, the socket 40a is provided with a longitudinal slot, designated generally 131 which is provided with or terminates in a relieved area 132. The socket configuration 40a may be molded integral with the end of the rack 36, or if desired, could be secured by adhesive to the end of a conventional adjusting screw of the type and kind 106 shown in FIG. 8.

The provision of the relieved area 132 and the longitudinal slot 131 are such that they in effect defined an upper portion or half 134 and a lower portion or half 136 each of which includes a partially spherical inner surfaces which serve to define the recess 54 for receiving the ball-head 28 of screw 26. The presence of the relieved area 132 imports sufficient flexibility to the components, such that the respective upper and lower portions can flex to permit the ball segment 28 to be disposed in recess 54. In the assembled condition, a fastener member 138 is used to hold the respective halves 134 and 136 in engagement about the ball-head 128. The degree of engagement would be sufficient to bring the longitudinal halves into abutment as illustrated, but would not overly clamp the ball 28 so that an articulated joint is still obtained.

Preparatory to assembly, the screw 138 would be removed, and sufficient flexibility exists for the ball 28 to be snapped into the recess 54 past the annular shoulder 140 provided on the entry end thereof. Thus, with the design of FIG. 10, extremely little force is required to initially assemble the ball portion 28 within the recess 54, yet through the employment of the screw fastener 138, an extremely reliable interconnection is attained that can withstand the forces created in service.

Figures 11, 12:
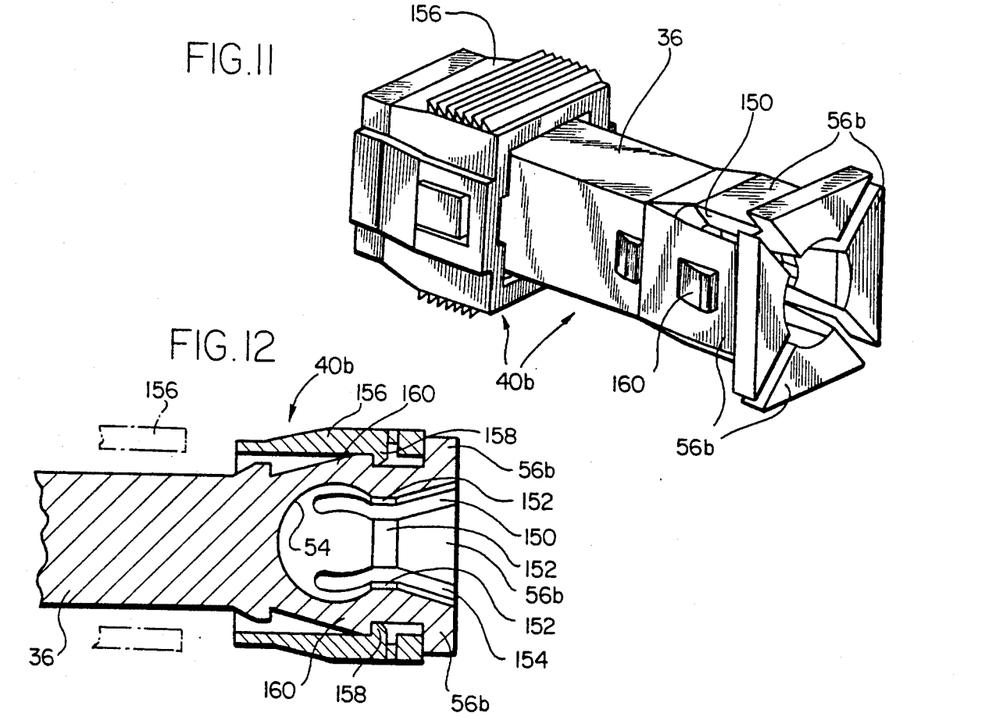
FIG. 11 is a perspective view of a further modified form of socket construction.
FIG. 12 is a sectional view of the socket construction of FIG. 11.

A further embodiment or type of the socket configuration is illustrated in FIGS. 11 and 12 and is designated generally 40b. FIG. 11 is a perspective view of the end of a rack member 36 with the socket configuration 40b thereon. For purposes of illustration, the teeth 60 on rack number 36 have not been included. FIG. 11, is a perspective illustration showing the arrangement of the components of the embodiment of 40b prior to engagement with a ball segment and also prior to effecting locking engagement therewith. FIG. 12, on the other hand, is a sectional view illustrating the components in the lock or final position.

More specifically, with the embodiment of 40b, the socket includes a plurality of radially disposed segments 56b. These segments are separated by relieved portions or slots 150. As such, the respective portions are in effect interconnected, but are cantilevered so that they can flex radially outward to accept a ball portion or segment 28 (not shown). As can be seen in FIG. 12, the respective segments 56b serve to define a partially spherical internal socket 54, a retention shoulder 152 and a tapered entry way 154. In addition, the socket construction 40b also includes a collar member 156 which is shown in the retracted position in FIG. 11 and in the assembly position in FIG. 12.

With the collar 156 retracted, FIG. 11, the ball portion of a screw can easily be inserted within the socket 54, as the segments 56b will flex outwardly to permit a disposition of said ball element therein. After the ball segment has been disposed in the socket 54, the collar 156 is moved forward from the position as shown in FIG. 11, to that as shown in FIG. 12. In assembled position of FIG. 11, the collar 156 will overlie the segments 56b and thereby restrict or inhibit the ability of these segments to flex radially outwardly. In this position, the ball component (not shown) will be captured within the socket 54. In addition, the collar 56 is provided with inwardly disposed detent means 158 that can be snapped over projections 160 formed on the segments 56b to lock the collar 156 in place. As can be seen, the projections 160 are ramped or sloped to facilitate movement of the collar 156 from the initial position, FIG. 11, to the final or locked position of FIG. 12.

Figures 13, 14:
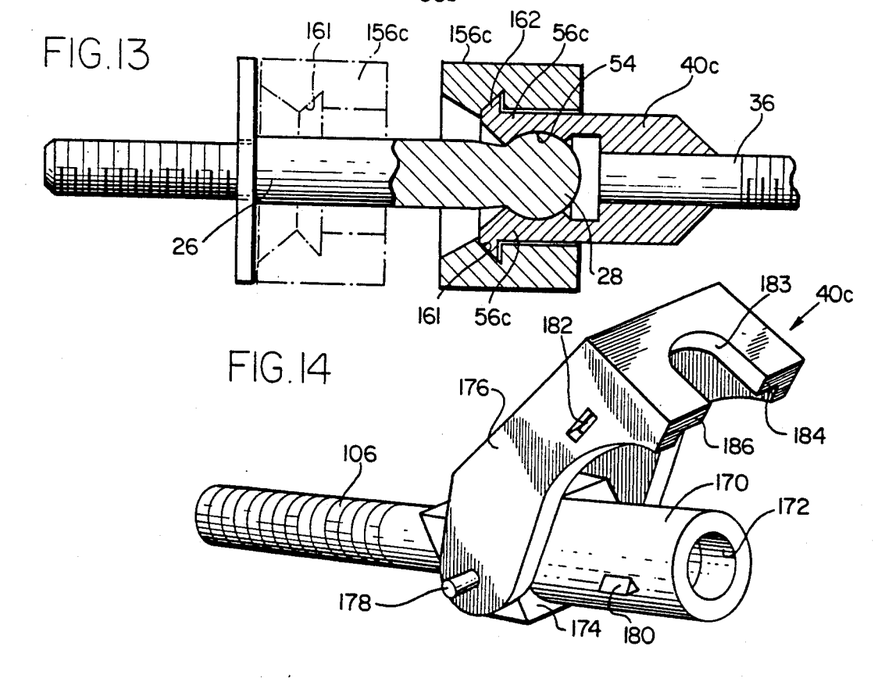
FIG. 13 is a sectional view of a still further modified form of socket construction.
FIG. 14 is a perspective view of still an additional modified form of socket construction.

The embodiment of FIG. 13 is somewhat similar to that of FIGS. 11 and 12, with the exception that the collar is carried on the ball screw member, as opposed to the socket. It should be noted, that FIG. 13 is a relatively schematic illustration of this concept. More specifically, the rack member 36 includes a socket element 40c disposed on the end thereof, which socket element will be split longitudinally (not shown) to facilitate reception of the ball component 28. The socket component 40c includes a partially spherical recess or socket 54 defined by socket segments 56c. The collar 156c is engaged over the segment 56c with a snap-fit engagement, and in this regard, the collar 156c will include an annular recess 161 into which detent means 162 formed on the end of the segments 56c is engaged to maintain the collar in the locked position.

In practice, the collar 156c will be carried on the ball screw member 26, as illustrated in phantom in FIG. 13. It is contemplated that some means will be employed in conjunction with the collar to maintain it on the ball screw 26 and prevent inadvertent disassembly. Accordingly, the ball segment 28 can easily be disposed within the partially spherical socket 54, and the collar 156 then moved to the right as viewed into engagement over the segments 56 with the snap-fit engagement provided by the groove 160 and detents 162 maintaining the assembled relationship. Again, it be emphasized that the embodiment as illustrated in FIG. 13 is somewhat schematic and is presented only to illustrate the general concept as discussed above.

In FIG. 14, there is illustrated a further socket configuration 40d which has been shown on the end of a screw type adjustment member 106, rather than on a rack adjusting member 36. To achieve this arrangement, the socket configuration 40d will be molded of a thermoplastic material and then affixed to the end of the metal screw member 106 with an adhesive to provide an integral component. It is to be understood, that this embodiment is equally adaptable for use on a rack 36 as well as an adjusting screw 106. In this regard, the embodiment 40d does not utilize the segmented portions which define th socket. Rather, there is provided an elongate cylindrical or barrel shaped portion 170 which is provided with a recess 172. The recess 172 will be of sufficient size to accept the ball component 28 (not shown) without employment of a snap-fit. That is to say, the ball component 28 may be readily disposed into the recess or pocket 172 without any type of force fit engagement. The elongate cylindrical portion 170 includes a generally rectangular mounting segment 174, which has a cover member 176 pivotally mounted thereon by pin means 178. Thus, the cover member 176 can move from the position as shown in full line, to a position wherein it overlies the socket or pocket 172. It should be noted, that the cylindrical portion 170 has a detent means 180 which can be disposed within a slot 183 with a snap-fit to hold the cover 176 in the assembled position (not shown). Further, the forward end wall of the cover 176 has a slot 183 formed therein, which defines a pair of spaced shoulders 184 and 186. The spacing between the shoulders 184 and 186 is defined by the width of the slot 183 and is selected to be less than the diameter of the ball portion 28 (not shown) to be disposed in the recess or pocket 172.

Thus, when it is desired to assemble the socket 40d to a ball segment 28, the ball segment 28 is disposed within the pocket 172 with a relatively free fit. Next, the cover 176 is pivoted from the position shown in FIG. 14, to a closed position wherein the detents 180 will engage in the grooves 182. When the cover 176 is pivoted to the closed position, the slot 183 will accept the shank portion of the ball screw member immediately behind the ball component. As such, the shoulders 184 and 186 will be disposed behind the ball component and will serve to prevent retraction of the ball component 28 from the pocket 172 The shoulders 184 and 186 will include arcuate surface portions (not shown) which will facilitate pivotal movement of the screw relative to socket 40d. It is believed, that although a view of the assembled version of this embodiment has not been included herein, one of ordinary skill in the art will readily understand the construction and operation of the socket assembly 40d.

Applicant has disclosed particular embodiments of the invention, as well as numerous inventive concepts which can be employed separately or in combination. In this regard, the invention has been described with respect to the illustrated embodiments in relatively comprehensive detail. It is contemplated and should be readily apparent that those skilled in the art will perceive various alterations or modifications of the illustrated embodiments, which do not depart from the spirit and scope of the invention in its broadest aspects. Some of these modifications may be routine engineering expediencies, while others will be apparent only after study of the invention and the specification presented above.

As such, the scope of Applicant's contribution to the art and the scope of the inventions disclosed herein are not intended and should not be limited by the particular embodiments and specific constructions described and illustrated, but rather are to be defined by the appended claims and equivalents thereof. As such, the claims as presented hereinafter are intended to cover all such changes and modifications which fall within the true spirit and scope of the invention.

The Invention is Claimed as Follows:

1. An adjusting mechanism for an articulated headlamp construction, or the like, comprising: a housing; a scroll member carried by said housing and journalled therein for rotation relative thereto, said scroll member including a generally planar spiral projection thereon; an adjusting rack member carried by said housing for substantially transitory movement relative thereto, said adjusting rack member having an end portion adapted to be operatively associated with said articulated headlamp construction such that said transitory movement of the adjusting rack member will produce movement of said headlamp construction, said rack member also having a series of laterally disposed teeth thereon with the spiral projection of said scroll member engaged between at least one pair of adjacent teeth on the rack member such that selective rotation of said scroll member relative to said housing will produce controlled transitory movement of said rack, and correspondingly adjusting movement of said articulated headlamp construction.

2. An adjusting mechanism according to claim 1, wherein said spiral projection is continuous except for entry and exit portions thereof and extends for at least approximately 360°.

3. An adjusting mechanism according to claim 2, wherein said spiral projection has a profile similar to a standard screw thread.

4. An adjusting mechanism according to claim 1, wherein said spiral projection on said scroll member is of a helical form and including a plurality of turns, such that a series of adjacent teeth on said rack member will be in driven engagement with said spiral projection.

5. An adjusting mechanism according to claim 1, wherein said teeth on said adjusting rack member are arcuate.

6. An adjusting mechanism according to claim 1, wherein said housing includes means for journalling said scroll member.

7. An adjusting mechanism according to claim 6, wherein said means for journalling said scroll member comprise an annular recess formed in a surface of said scroll member opposite said spiral projection, and said housing includes a circular flange disposed in said recess to fix the positioning of said scroll member and mount said scroll member for rotation about its axis.

8. An adjusting mechanism according to claim 1, wherein said spiral projection is formed on a helix and includes a plurality of helical turns, with the engagement of said spiral projection turns with the teeth on the rack being limited to a cordal segment of said spiral projection such that no corresponding engagement between the spiral projection and the rack teeth exists at a location diametrically opposed to said cordal segment.

9. An adjusting mechanism according to claim 1, wherein said rack includes a portion having said teeth formed thereon, and an adjacent portion which is relieved with respect to the root dimension of said teeth, such that said spiral projection turns are engaged with the teeth on the rack only at a single cordal segment of the spiral scroll and the axis of the scroll member and rack member may be disposed substantially at right angles to each other.

10. An adjusting mechanism according to claim 1, wherein said rack end portion includes means formed thereon for engaging cooperating means on said headlamp construction, said means being in the form of a socket member or said rack and defining a socket for the reception of a ball member, or the like, carried by said headlamp construction thereby operatively to interconnect said rack with said headlamp construction.

11. A headlamp mechanism according to claim 10, wherein said socket means includes a first socket portion and a pivotally mounted component affixed to the end of said rack defining a second socket portion such that said ball screw may be positioned within said first socket portion and said pivotally mounted component moved into overlying position to capture said ball within said socket, and means for maintaining said pivotally mounted member in said overlying relationship.

12. An adjusting mechanism according to claim 10, wherein said socket means is defined by a plurality of socket components which are integrally interconnected, to define a partially spherical socket, and are relatively flexible with respect to each other, so that said socket components may flex to permit a ball component to be disposed in the partially spherical socket defined therein, and means for maintaining said socket components overlying engaged relation with respect to said ball component.

13. An adjusting mechanism according to claim 12, wherein said means for maintaining said socket components in assembly comprises a screw member.

14. An adjusting mechanism according to claim 12, wherein said means for maintaining said socket components in assembly comprises a collar that overlies said socket components to preclude outward flexing thereof and thereby maintain said components in engagement with said ball member.

15. An adjusting mechanism according to claim 14, wherein said socket includes at least four socket segments and snap-fit means for maintaining said collar in the overlying position.

16. An adjusting mechanism according to claim 14, wherein said collar is slidably mounted upon an end of said adjusting rack member and detent means are provided for maintaining said collar in position to overlie the socket components.

17. An adjusting mechanism for an articulated headlamp construction, or the like, comprising: a housing; a scroll member carried by said housing and journalled therein for rotation relative thereto, said scroll member including a spiral projection thereon and an axial projection extending from said housing and having tool engaging means thereon and an annular flange portion disposed internally of said housing, said annular flange portion having the spiral projection formed in a surface thereof facing an adjusting rack member carried by said housing for substantially transitory movement relative thereto, said adjusting rack member having an end portion adapted to be operatively associated with said articulated headlamp construction such that said transistory movement of the adjusting rack member will produce movement of said headlamp construction, said rack member also having a series of laterally disposed teeth thereon with the spiral projection of said scroll member engaged between at least one pair of adjacent teeth on the rack member such that selective rotation of said scroll member relative to said housing will produce controlled transitory movement of said rack, and correspondingly adjusting movement of said articulated headlamp construction.

18. An adjusting mechanism according to claim 17, further including means on said housing for mounting said scroll member for rotative movement.

19. An adjusting mechanism for an articulated headlamp construction, or the like, comprising: a housing; a scroll member carried by said housing and journalled therein for rotation relative thereto, said scroll member including a spiral projection thereon; an adjusting rack member carried by said housing for substantially transitory movement relative thereto, said adjusting rack member having an end portion adapted to be operatively associated with said articulated headlamp construction such that said transitory movement of the adjusting rack member will produce movement of said headlamp construction, said rack member also having a series of laterally disposed teeth thereon with the spiral projection of said scroll member engaged between at least one pair of adjacent teeth on the rack member such that selective rotation of said scroll member relative to said housing will produce controlled transitory movement of said rack, and correspondingly adjusting movement of said articulated headlamp construction, said adjusting rack member being curved so that the transitory movement of the end portion of said rack adapted to be operatively associated with said articulated headlamp structure, will move in an arc.

20. An adjusting mechanism for an articulated headlamp construction, or the like, comprising: a housing; a scroll member carried by said housing and journalled therein for rotation relative thereto, said scroll member including a spiral projection thereon; an adjusting rack member carried by said housing for substantially transitory movement relative thereto, said adjusting rack member having an end portion adapted to be operatively associated with said articulated headlamp construction such that said transitory movement of the adjusting rack member will produce movement of said headlamp construction, said rack member also having a series of laterally disposed teeth thereon with the spiral projection of said scroll member engaged between at least one pair of adjacent teeth on the rack member such that selective rotation of said scroll member relative to said housing will produce controlled transitory movement of said rack, and correspondingly adjusting movement of said articulated headlamp construction, said rack and said scroll member defining intersecting axes and said axes intersect to define an obtuse angle.

21. An adjusting mechanism according to claim 20, wherein said adjusting rack member is curved.

22. An adjusting mechanism for an articulated headlamp construction, or the like, comprising: a housing; a scroll member carried by said housing and journalled therein for rotation relative thereto, said scroll member including a spiral projection thereon; an adjusting rack member carried by said housing for substantially transitory movement relative thereto, said adjusting rack member having an end portion adapted to be operatively associated with said articulated headlamp construction such that said transitory movement of the adjusting rack member will produce movement of said headlamp construction, said rack member also having a series of laterally disposed teeth thereon with the spiral projection of said scroll member engaged between at leas one pair of adjacent teeth on the rack member such that selective rotation of said scroll member relative to said housing will produce controlled transitory movement of said rack, and correspondingly adjusting movement of said articulated headlamp construction, said adjusting rack member being elongate and defines a relatively straight axis, said scroll member being mounted to said housing such that the axis thereof is offset with respect to a line perpendicular to the axis of the adjusting rack member, such that the axis of said scroll member and the axis of the adjusting rack member intersect to define an acute angle.

23. In combination, an articulated headlamp component including a fixed pivot point, or the like, about which said headlamp component pivots, and an adjusting mechanism operatively associated with said articulated headlamp component for attaining a desired position thereof, said adjusting mechanism comprising: a housing, a rotatable input member within said housing and an output member to which said input member is operatively connected, and said output member being fixed against rotation relative to said housing, such that rotation of said input member will produce transitory movement of said output member, said output member being formed of a molded thermoplastic material and having a distal end which is operatively associated with said articulated headlamp component; a stationary ball member affixed directly to said headlamp component; said distal end of said molded thermoplastic output member including an integral socket construction molded integral with said output member for receiving said ball member therein while resisting retractive movement thereof to affix said output member to said headlamp component.

24. The combination according to claim 23, wherein said socket construction includes a first socket portion and a pivotally mounted component affixed to the end of said output member defining a second socket portion such that said ball member may be positioned within said first socket portion and said pivotally mounted component moved into overlying position to capture said ball within said first socket portion, and means for maintaining said pivotally mounted member in said overlying relationship.

25. The combination according to claim 23, wherein said socket construction is defined by a plurality of socket components which are integrally interconnected, to define a partially spherical socket, and are relatively flexible with respect to each other, so that said socket components may flex to permit a ball component to be disposed in the partially spherical socket defined thereby, and means for maintaining said socket components overlying engaged relation with respect to said ball component.

26. The combination according to claim 25, wherein said means for maintaining said socket components in assembly comprises a screw member.

27. The combination according to claim 25, wherein said means for maintaining said socket components in assembly comprises a collar that overlies said socket components to preclude outward flexing thereof and thereby maintain said components in engagement with said ball member.

28. The combination according to claim 27, wherein said socket includes at least four socket segments and snap-fit means for maintaining said collar in the overlying position.

29. The combination according to claim 27, wherein said collar is slidably mounted upon an end of said adjusting rack member and detent means are provided for maintaining said collar in position to overlie the socket components.

30. An adjusting mechanism according to claim 23, wherein said output member is a rack.

31. An adjusting mechanism adapted to be operatively associated with an articulated headlamp component for controlling the position thereof, wherein said articulated headlamp includes a fixed pivot point, or the like, about which said headlamp component pivots, said adjusting mechanism comprising: a housing; a rotatable input member within said housing; an output member to which said input member is operatively connected, said output member being fixed against rotation relative to said housing, such that rotation of said input member will produce transitory movement of said output member; said output member being formed of a molded thermoplastic material and having a distal end which is adapted to be operatively associated with a stationary ball member affixed directly to said articulated headlamp component, said distal end of said output member including a socket construction molded as an integral component of said output member and adapted to receive said ball member therein while resisting retractive movement thereof to affix said output member to said headlamp component.

32. An adjusting mechanism according to claim 31, further including a housing for said input member and said output member, said input member being defined by a scroll member carried by said housing and journalled therein for rotation relative thereto, said scroll member including a spiral projection; said output member being defined by an adjusting rack member carried by said housing and having a series of teeth thereon, said adjusting rack member having said socket construction formed thereon.

33. An adjusting mechanism according to claim 32, wherein said rack has a series of teeth thereon with the spiral projection of the scroll member engaged with at least one pair of adjacent teeth and preferably a series of pairs of adjacent teeth such that selective rotation of the scroll member will produce controlled transitory movement of the adjusting rack member.

34. An adjusting mechanism according to claim 32, wherein said spiral projection on said scroll member is of a helical form and including a plurality of turns, such that a series of adjacent teeth on aid rack member will be in driven engagement with said spiral projection.

35. An adjusting mechanism according to claim 32, wherein said spiral projection is formed on a helix and includes a plurality of helical turns, with the engagement of said spiral projection turns with the teeth on the adjusting rack member being limited to a cordal segment of said spiral projection such that no corresponding engagement between the spiral projection and the rack teeth exists at a location diametrically opposed to said cordal segment.

36. An adjusting mechanism according to claim 32, wherein said rack includes a portion having said teeth formed thereon, and an adjacent portion which is relieved with respect to the root dimension of said teeth, such that said spiral projection is engaged with the teeth on the rack only at a single cordal segment of the spiral scroll and the axis of the scroll member and rack member may be disposed substantially at right angles to each other.

37. An adjusting mechanism according to claim 31, wherein said socket construction includes a first socket portion and a pivotally mounted component affixed to the end of said output member and defining a second socket portion such that said ball member may be positioned within said first socket portion and said pivotally mounted component moved into overlying position to capture said ball within said socket, and means for maintaining said pivotally mounted member in said overlying relationship.

38. An adjusting mechanism according to claim 31, wherein said socket construction is defined by a plurality of socket components which are integrally interconnected to define a partially spherical socket, and are relatively flexible with respect to each other, so that said socket components may flex to permit a ball member to be disposed in the partially spherical socket defined thereby, and means for maintaining said socket components in overlying engaged relation with respect to said ball component.

39. An adjusting mechanism according to claim 38, wherein said means for maintaining said socket components in assembly comprises a screw member.

40. An adjusting mechanism according to claim 38, wherein said means for maintaining said socket components in assembly comprises a collar that overlies said socket components to preclude outward flexing thereof and thereby maintain said components in engagement with said ball member.

41. An adjusting mechanism according to claim 40, wherein said socket includes at least four socket segments and snap-fit means for maintaining said collar in the overlying position.

42. An adjusting mechanism according to claim 40, wherein said collar is slidably mounted upon an end of said adjusting rack member and detent means are provided for maintaining said collar in position to overlie the socket components.

43. An adjusting mechanism according to claim 31, wherein said output member is a rack.

44. An adjusting mechanism adapted to be operatively associated with an articulated headlamp component for controlling the position thereof, wherein said articulated headlamp includes a fixed pivot point, or the like, about which said headlamp component pivots, said adjusting mechanism comprising: a rotatable input member; an output member to which said input member is operatively connected, such that rotation of said input member will produce transitory movement of said output member; said output member having a distal end which is adapted to be operatively associated with a ball member affixed to said articulated headlamp component, said distal end of said output member including a socket construction adapted to receive said ball member therein while resisting retractive movement thereof to affix said output member to said headlamp component, and further including a housing for said input member and said output member, said input member being defined by a scroll member carried by said housing and journalled therein for rotation relative thereto, said scroll member including a spiral projection; said output member being defined by an adjusting rack member carried by said housing and having a series of teeth thereon, said adjusting rack member having said socket construction formed thereon, wherein said adjusting rack member is curved so that the transitory movement of the end portion of said rack member adapted to be operatively associated with said articulated headlamp structure, will move in an arc.

* * * * *

UNITED STATES PATENT AND TRADEMARK OFFICE
CERTIFICATE OF CORRECTION

PATENT NO. : 5,186,532

DATED : February 16, 1993

INVENTOR(S) : Francis E. Ryder, Rowland W. Kanner and Stephen P. Lisak

It is certified that error appears in the above-identified patent and that said Letters Patent is hereby corrected as shown below:

Column 8, Line 37 "36' will move back and Due to overall configuration of" should read — 36' will move back and forth in a generally linear path as indicated by arrow 37'. Due to overall configuration of —

Column 16, Line 1 " leas" should be — least —

Signed and Sealed this

Twenty-first Day of December, 1993

*Attest:*

BRUCE LEHMAN

*Attesting Officer*     *Commissioner of Patents and Trademarks*